United States Patent [19]

Shinohara

[11] Patent Number: 5,783,619

[45] Date of Patent: Jul. 21, 1998

[54] POLYACETAL RESIN COMPOSITION AND SLIDING PARTS

[75] Inventor: Kenichi Shinohara, Kanagawa, Japan

[73] Assignee: E. I. du Pont de Nemours and Company, Wilmington, Del.

[21] Appl. No.: 716,232

[22] PCT Filed: Mar. 23, 1995

[86] PCT No.: PCT/US95/03202

§ 371 Date: Oct. 25, 1996

§ 102(e) Date: Oct. 25, 1996

[87] PCT Pub. No.: WO95/25769

PCT Pub. Date: Sep. 28, 1995

[30] Foreign Application Priority Data

Mar. 24, 1994 [JP] Japan .................... 6-053666

[51] Int. Cl.$^6$ .................... C08K 5/10; C08K 5/101; C08K 5/103

[52] U.S. Cl. .................... 524/318; 524/311; 524/312; 524/313; 524/315; 524/306

[58] Field of Search .................... 524/306, 311, 524/312, 313, 305, 318

[56] References Cited

U.S. PATENT DOCUMENTS

| | | | |
|---|---|---|---|
| 4,041,002 | 8/1977 | Aboshi et al. ................ | 524/318 |
| 5,106,896 | 4/1992 | Endo et al. .................. | 524/318 |
| 5,191,006 | 3/1993 | Matsumoto et al. ........... | 524/311 |
| 5,346,737 | 9/1994 | Takahashi et al. ............ | 524/315 |
| 5,559,180 | 9/1996 | Takahashi et al. ............ | 524/315 |

FOREIGN PATENT DOCUMENTS

| | | | |
|---|---|---|---|
| 169 721 | 1/1986 | European Pat. Off. ........ | 524/313 |
| 372681 | 6/1990 | European Pat. Off. ........ | 524/318 |
| 179 655 | 10/1984 | Japan ........................ | 524/313 |
| 189356 | 7/1990 | Japan ........................ | 524/313 |
| 2205841 | 12/1988 | United Kingdom .......... | 524/315 |

*Primary Examiner*—Peter A. Szekely

[57] ABSTRACT

There is disclosed a polyacetal resin composition that has excellent slidability and abrasion resistance and makes it possible to propose molded parts free of problems such as abrasion and noises such as squeaking caused by abrasion even when used under high load and high sliding speed conditions even when the material of the partner sliding parts is any type of plastic or metal. The resin includes from 0.5 to 15 parts by weight of olefinic elastomer, from 0.1 to 5.0 parts by weight of fatty acid ester having at least 12 carbon atoms, and, if necessary, from 0.05 to 5.0 parts by weight of polytetrafluoroethylene micropowder per 100 parts by weight of polyacetal resin.

6 Claims, No Drawings

POLYACETAL RESIN COMPOSITION AND SLIDING PARTS

This Application is a 371 of PCT/U.S. 95/03202 Mar. 31, 1995.

DETAILED DESCRIPTION OF THE INVENTION

The present invention concerns a polyacetal resin composition with excellent slidability and abrasion resistance appropriately used for sliding parts and plastic sliding parts. More specifically, it concerns a polyacetal resin composition that makes it possible to propose sliding parts with excellent slidability and abrasion resistance even when the material of the partner sliding part is plastic or metal when used as sliding parts, and sliding parts that employ this composition.

Polyacetal resin is a resin that has excellent mechanical properties and heat resistance, especially abrasion resistance, and is used for sliding parts in a wide range of fields.

Methods of adding inorganic solid lubricants such as molybdenum disulfide and graphite, liquid, or semisolid lubricants such as petroleum lubricants, synthetic lubricants, aliphatic alcohols or esters thereof, and polyolefin resin micropowders with a molecular weight of at least 500,000 are known in order to further improve the abrasion resistance of polyacetal resin.

However, even if the partner sliding part is made of plastic, the abrasion resistance varies greatly depending on the type of plastic. Even though there are good properties for partner sliding parts made of certain types of plastics, the problem is that the abrasion resistance is poor to partner sliding parts made from other plastics. The lubricant had to be selected by taking into consideration the material of the partner sliding parts with which contact was to be made.

Nonetheless, gears, rollers, cams, switches, etc., made from many types of plastic materials, beginning with polyacetal, are used in electrical and electronic equipment, especially office machinery such as audio machines, copy machines, and printers. For example, gears are designed so that the speed of rotation is regulated by the connection of several gears. There are consequently cases in which gears made of polyacetal are meshed with gears made of polyacetal or other plastics. Consequently, the development of a polyacetal resin composition that makes it possible to provide excellent slidability and abrasion resistance even without selecting the lubricant by taking into consideration the type of plastic was desired.

A polyacetal resin composition with a density of no more than 0.93 g/cm$^3$ that contains no more than 15% by weight of polyolefin resin with a weight mean molecular weight of no more than 500,000 was consequently developed (Japanese Patent Application No. Hei 5-143322) as a polyacetal resin composition with excellent abrasion resistance regardless of the type of plastic from which the partner sliding parts are made.

Nonetheless, metal shafts are inserted in the inner diameter of gears. Good slidability and abrasion resistance between polyacetal and metal are therefore required simultaneously in addition to the good slidability and abrasion resistance between polyacetal and other plastics. Even though there is a certain level of good slidability and abrasion resistance when the partner sliding parts are made of metal when one uses a polyacetal resin composition with a density of no more than 0.93 g/cm$^3$ that contains no more than 15% by weight of polyolefin resin with a weight mean molecular weight of no more than 500,000, the problem was that abrasion developed with long term operation and noises such as squeaking were produced by abrasion when used under high load or high sliding speed conditions.

International Patent Application WO 93/11206 of E. I. du Pont de Nemours and Company discloses lubricated polyacetal compositions containing at least one lubricant and a copolymer of the general formula E/X/Y, wherein E is ethylene; X is methyl, ethyl, or butyl acrylate; and Y is glycidyl acrylate or methacrylate, or glycidyl vinyl ether.

European Patent Application EP-A-354 802 of Polyplastics Co., Ltd. discloses polyacetal compositiins and sliding member, wherein the compositions comprises 0.5 to 40 parts by weight, per 100 parts of polyacetal resin, of a graft copolymer which is in the form of a branched or crosslinked material formed by chemical bonding of an olefinic polymer to a vinyl polymer or another polymer.

European Patent Application EP-A-420 564 of Polyplastics Co., Ltd. describes anti-friction and wear-resistant compositions and molded sliding member, which compositions comprise, in addition to the components recited in EP-A-354 802, 0.1–20 parts by weight of a lubricant and 0.5–30 parts by weight of a fine inorganic powder per 100 parts by weight of polyacetal resin.

U.S. Pat. No. 4,041,002 to Aboshi et al. (Asahi Kasei Kogyo, K. K.) describes thermoplastic resin compositions having good lubricity and wear resistance. The base thermoplastic resin can be a polyacetal. The composition comprises 0.3 to 25 eight % of a lubricant and 0.2 to 20 weight % of an ethylene/vinyl acetate copolymer.

Finally, Kunststoff Handbuch 3/1, Polycarbonate, Polyacetale, polyester, Celluloseester, Dr. Ludwig Bortenbruch, Publisher, Hanser Verlag 1992, pages 326–331, discloses blends of polyacetals with EPM and EPDM elastomers.

The object of the present invention is to propose a polyacetal resin composition that has excellent slidability and abrasion resistance and makes it possible to propose molded goods free of problems such as abrasion and noises such as squeaking even when used under high load or high sliding speed conditions when the partner sliding part material is any type of plastic or metal.

The first embodiment of the present invention that attains this goal is a polyacetal resin composition characterized by containing from 0.5 to 15 parts by weight of olefinic elastomer and from 0.1 to 5.0 parts by weight of fatty acid ester having at least 12 carbon atoms per 100 parts by weight of polyacetal resin.

The second embodiment of the present invention is a polyacetal resin composition characterized by containing from 0.5 to 15 parts by weight of olefinic elastomer, from 0.1 to 5.0 parts by weight of fatty acid ester having at least 12 carbon atoms, and from 0.05 to 5.0 parts by weight of polytetrafluoroethylene micropowder.

The third embodiment of the present invention is polyacetal sliding parts characterized by being sliding parts that slide against parts made from plastic or metal and being made from polyacetal resin that contains from 0.5 to 15 parts by weight of olefinic elastomer and from 0.1 to 5.0 parts by weight of fatty acid ester having at least 12 carbon atoms per 100 parts by weight of polyacetal resin.

The fourth embodiment of the present invention is polyacetal resin sliding parts characterized by being sliding parts that slide against parts made from plastic or metal and being made from a polyacetal resin composition that contains from 0.5 to 15 parts by weight of olefinic elastomer, from 0.1 to 5.0 parts by weight of fatty acid ester having at least 12 carbon atoms, and from 0.05 to 5.0 parts by weight of polytetrafluoroethylene micropowder per 100 parts by weight of polyacetal resin.

The polyacetal resin of the present invention includes polyacetal copolymers with cyclic ethers and cyclic polymers in addition to polyacetal homopolymers. However, since the physical properties (tensile properties, Izod impact properties, bending properties, and compression properties) are sometimes lowered by the addition of lubricant, etc., in copolymers, it is preferable to use polyacetal homopolymers.

The olefinic elastomers of the present invention are ethylene-propylene copolymers (EPM) or ethylene-propylene-diene copolymers (EPDM). Examples of the dienes of the third component include 1,4-hexadiene, ethylidene norbornene, and dicyclopentadiene. The elastomer viscosity is preferably low to improve the slidability and abrasion resistance to plastics and metals by dispersing the olefin elastomer in the form of microparticles in the polyacetal resin. The rubber Mooney viscosity (JIS K-6300, 121° C.) is preferably no more than 50.

The olefinic elastomer is contained in a quantity of from 0.5 to 15 parts by weight, preferably 1.5 to 5.0 parts by weight, per 100 parts by eight of polyacetal resin. The slidability and abrasion resistance with plastics cannot be improved by less than 0.5 part by weight. The mechanical properties inherent to the polyacetal drop when there is more than 15 parts by weight.

The fatty acid esters used in the present invention are saturated or unsaturated fatty acids that have at least 12 carbon atoms. Examples of such fatty acids include lauric acid, tridecylenic acid, myristic acid, pentadecylenic acid, palmitic acid, heptadecylenic acid, stearic acid, nonadecanoic acid, alginic acid, behenic acid, lignoceric acid, cerotinic acid, heptacosanic acid, montanic acid, melissic acid, oleic acid, elaidic acid, linoleic acid, linolenic acid, arachidonic acid, and erucic acid. Examples of the alcohols used to obtain the fatty acid esters of the present invention include monohydric alcohols such as methanol, ethanol, propanol, n-butyl alcohol, isobutyl alcohol, n-octyl alcohol, 2-ethylhexyl alcohol, undecyl alcohol, isodecyl alcohol, and lauryl alcohol, dihydric alcohols such as ethylene glycol, propylene glycol, diethylene glycol, and 1,4-butanediol, and polyhydric alcohols such as glycerin, sorbitan, and pentaerythritol. Fatty acid esters are obtained by an esterification reaction of these alcohols and the aforementioned fatty acids.

The fatty acid esters are contained in a quantity of from 0.1 to 5.0 parts by weight, preferably 0.3 to 2.0 parts by weight, per 100 parts by weight of polyacetal resin. The slidability and abrasion resistance with metal cannot be improved when there is less than 0.1 part by weight. More than 5.0 parts by weight causes a drop in the mechanical properties inherent to the polyacetal.

The polytetrafluoroethylene (PTFE) micropowder of the present invention is commonly used PTFE, especially resin micropowder developed as an additive to other plastics. It is a micropowder with a particle diameter of no more than 50 µm and a mean particle diameter of from 2 to 30 µm. The melt viscosity of the PTFE micropowder used in the present invention preferably ranges from $10^7$ to $10^8$ poise at a measurement temperature of 380° C. as opposed to the viscosity of commonly used PTFE resin which ranges from $10^{10}$ to $10^{11}$ poise at a measurement temperature of 380° C.

The content of PTFE micropowder is from 0.05 to 5.0 parts by eight, preferably 0.1 to 2.0 parts by weight, per 100 parts by weight of polyacetal resin. The appearance of the surface of the molded goods cannot be improved when there is less than 0.05 part by weight. Problems arise in terms of heat resistance when there is more than 5.0 parts by weight.

Known methods can be used as the method of producing the polyacetal resin composition of the present invention. Examples include methods of mechanically blending the components by extruder or kneader.

Various additives such as stabilizers, nucleus agents, antistatic agents, flame retardants, colorants, and lubricants used in polyacetal resin may also be added to the polyacetal resin composition of the present invention.

The sliding parts of the present invention are those formed, for example, by injection molding, using the polyacetal resin composition described above. Concrete examples include sliding parts such as gears, rollers, cams, and switches used in electrical and electronic equipment, especially office machinery such as audio equipment, copy machines, and printers.

Together with having improved slidability and abrasion resistance primarily with plastics by combining an olefinic elastomer, the polyacetal resin composition of the present invention also makes it possible to improve the slidability and abrasion resistance primarily with metal by combining fatty acid esters. Combination of PTFE micropowder also makes it possible to further improve the slidability and abrasion resistance with plastics and metals together with markedly improving the appearance of the surface of the molded goods.

EXAMPLES

The present invention is explained more concretely below through the following examples.

Examples 1 to 7 and Comparative Examples 1 to 6

As shown in Table 1, various additives were added to polyacetal resin and resin pellets were produced by melt kneading at a resin temperature of 200°–210° C. using a biaxial extruder (Toshiba IS-220EN), cooling with water, and cutting.

75 mm×125 mm×3.2 mm test pieces for the plate side were produced from the various resin pellets using an injection molding machine (Toshiba IS220EN-35) to conduct tests of the friction and abrasion properties of the molded goods. On the other hand, caps stipulated by JIS K-7218 (type A) were molded using polyacetal or steel and taken as test pieces for the cap side in friction and abrasion testing.

Friction and abrasion tests and test of the surface appearance were conducted by the following methods.

Friction and Abrasion Property Test

Conducted by Suzuki type friction and abrasion tester (made by Kochi Hoseihin) based on JIS K-7218 (type A).

Test Conditions (I) When the partner material was polyacetal Load: 2 kg weight, speed: 15 cm/sec, travel distance: 1.62 km. (II) When the partner material was steel (S45C) Load: 5 kg weight, speed: 50 cm/sec, travel distance: 40.0 km.

Dynamic Friction Coefficient

The dynamic friction coefficient was calculated by the following formula by determining the mean value of the changes over time in the recorded torque based on the recorded chart.

Numerical Formula 1

Dynamic Friction Coefficient =

$$\frac{\text{Mean value of torque generated (kg/cm)}}{\text{Test load (kg)} \times \text{Shape constant (1.14 cm)}}$$

Abrasion

The amount of abrasion was obtained by measuring the total eight of each test piece (cap and plate) before and after the test and determining the difference.

Olefinic Elastomer: EPDM rubber with a Mooney viscosity of 25 (JIS K-6300, 121° C.) (made by DuPont, Nordel® [phonetic] 2722).

Fatty Acid Ester A: Ethylene glycol distearate (made by Kao, Emanone).

Fatty Acid Ester B: Glycerin monostearate (made by Riken Bitamin, Rikemarl [phonetic] S100A).

PTFE Micropowder: Particle diameter no more than 50 µm, mean particle diameter 2–30 µm, melt viscosity $10^7$–$10^8$ poise (measurement temperature 380° C.) (made by Mitsui DuPont Fluorochemical, Teflon® MP-1300).

TABLE 1

| | Poly-acetal | Olefinic Elasto-mer | Fatty Acid Ester | PTFE Micro-powder | Friction Properties by Same Polyacetal | | Friction Properties to Metal | | Surface Appea-rance |
|---|---|---|---|---|---|---|---|---|---|
| | | | | | Dynamic Friction Coeffi-cient (µm) | Amount of Abrasion (mg) | Dynamic Friction Coeffi-cient (µm) | Amount of Abrasion (mg) | |
| Practical Example 1 | A 100 | 3.0 | A:1.0 | — | 0.22 | <1.0 | 0.27 | ~3.0 | 4 |
| Practical Example 2 | A 100 | 3.0 | B:1.0 | — | 0.26 | <1.0 | 0.24 | ~2.0 | 3 |
| Practical Example 3 | A 100 | 2.0 | A:1.0 | — | 0.26 | <1.0 | 0.24 | ~2.0 | 4 |
| Practical Example 4 | B 100 | 2.0 | A:1.0 | — | 0.25 | <1.0 | 0.24 | ~2.0 | 4 |
| Practical Example 5 | A 100 | 2.0 | A:1.0 | 0.2 | 0.23 | <1.0 | 0.24 | <1.0 | 5 |
| Practical Example 6 | A 100 | 2.0 | A:0.75 | 0.5 | 0.22 | <1.0 | 0.26 | ~2.0 | 5 |
| Practical Example 7 | B 100 | 2.0 | A:1.0 | 0.3 | 0.23 | <1.0 | 0.25 | <1.0 | 5 |
| Comparative Example 1 | A 100 | 3.0 | — | — | 0.28 | <1.0 | 0.26 | ~8.0 | 2 |
| Comparative Example 2 | A 100 | 2.0 | — | — | 0.30 | ~2.0 | 0.30 | ~14.0 | 3 |
| Comparative Example 3 | A 100 | — | A:1.0 | — | 0.37 | ~25.0 | 0.20 | ~2.0 | 5 |
| Comparative Example 4 | B 100 | — | B:1.0 | — | 0.35 | ~21.0 | 0.21 | ~3.0 | 5 |
| Comparative Example 5 | A 100 | — | — | — | 0.26 | >60 | 0.35 | ~20.0 | 5 |
| Comparative Example 6 | A 100 | — | — | 0.5 | 0.25 | >80 | 0.34 | ~15.0 | 5 |

Test of Surface Appearance

The test pieces molded for friction and abrasion property testing were evaluated by the following standards.

5: Excellent appearance
4: Slight clouding near gate
3: Silvering caused by resin flow seen near gate
2: Silvering seen all over
1: Lacking uniformity and luster together with development of silvering The above results are shown in Table 1.

Furthermore, the resins and additives used in the practical and comparative examples were as follows.

Polyacetal A: Polyacetal homopolymer with a melt index of 10.5 (190° C., load 1060 g) (made by DuPont, Tellurin [phonetic] 900 P).

Polyacetal B: Polyacetal homopolymer with a melt index of 6.3 (190° C., load 100 g) (made by DuPont, Tellurin 500 P).

As shown in Table 1, the compositions of practical examples 1 to 4 are understood to have good slidability and abrasion resistance both when the partner material is plastic and metal in contrast to comparative examples 1 to 6. As is also evident from a comparison of the compositions of practical examples 1 to 4 and the compositions of practical examples 5 to 7, combination of PTFE micropowder further improves the slidability against plastic and metal together with markedly improving the surface appearance of the molded goods.

As has been explained above, the polyacetal resin composition of the present invention makes it possible to propose molded goods free of problems caused by abrasion and noises such as squeaking caused by abrasion when used under high load and high sliding speed conditions even when the material of the partner sliding parts is any type of plastic or metal. The sliding parts of the present invention also are free of problems such as abrasion and noises such as squeaking caused by abrasion when used under high load and high sliding speed conditions even when the material of the partner sliding parts is any type of plastic or metal.

I claim:

1. A polyacetal resin composition characterized by containing from 0.5 to 15 parts by weight of olefinic elastomer which is either an ethylene/propylene (EPM) copolymer or an ethylene/propylene/diene (EPDM) copolymer and from 0.1 to 5.0 parts by weight of fatty acid ester having at least 12 carbon atoms per 100 parts by weight of polyacetal resin.

2. The polyacetal resin composition of claim 1 wherein the viscosity of the olefinic elastomer is no more than 50 by rubber Mooney viscosity.

3. A polyacetal resin composition of claim 1 further characterized by containing from 0.1 to 5.0 parts by weight of a fatty acid ester having at least 12 carbon atoms, and from 0.05 to 5.0 parts by weight of polytetrafluoroethylene micropowder per 100 parts by weight of polyacetal resin.

4. A polyacetal resin composition of claim 3 wherein the viscosity of the olefinic elastomer is no more than 50 by rubber Mooney viscosity.

5. Polyacetal sliding parts characterized by being sliding parts that slide against parts made of plastics or metal and being made from a polyacetal resin that contains from 0.5 to 15 parts by weight of an olefinic elastomer which is either an ethylene/propylene (EPM) copolymer or an ethylene/propylene/diene (EPDM) copolymer, and from 0.1 to 5.0 parts by weight of fatty acid ester having at least 12 carbon atoms per 100 parts by weight of polyacetal resin.

6. Polyacetal resin sliding parts characterized by being sliding parts that slide against parts made from plastics or metal and being made from a polyacetal resin composition that contains from 0.5 to 15 parts by weight of an olefinic elastomer which is either an ethylene/propylene (EPM) copolymer or an ethylene/propylene/diene (EPDM) copolymer, from 0.1 to 5.0 parts by weight of fatty acid ester having at least 12 carbon atoms, and from 0.05 to 5.0 parts by weight of polytetrafluoroethylene micropowder per 100 parts by weight of polyacetal resin.

* * * * *

UNITED STATES PATENT AND TRADEMARK OFFICE
CERTIFICATE OF CORRECTION

PATENT NO.  : 5,783,619  
DATED       : July 21, 1998  
INVENTOR(S) : Shinohara

Page 1 of 2

It is certified that error appears in the above-identified patent and that said Letters Patent is hereby corrected as shown below:

On the title page: Item [56] insert the following:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | WO | 93/ | 1 | 1 | 2 | 0 | 6 | 6/10/93 | PCT | | | | |
| | | | 1 | 0 | 0 | 6 | 1 | 9 | 0 | 9/29/65 | Great Britain | | | |
| | | | 0 | 3 | 5 | 4 | 8 | 0 | 2 | 2/14/90 | EPO | | | |
| | | | 0 | 4 | 2 | 0 | 5 | 6 | 4 | 4/3/91 | EPO | | | |
| | | | 2 | 2 | 1 | 2 | 3 | 7 | 7 | 7/26/74 | FR | | | |
| | | JP | 6 | 0 | 4 | 9 | 3 | 20 | 2/22/94 | Japan | | | | |
| | | JP | 5 | 1 | 4 | 3 | 3 | 22 | 6/11/93 | Japan | | | | |

UNITED STATES PATENT AND TRADEMARK OFFICE
CERTIFICATE OF CORRECTION

PATENT NO.    : 5,783,619
DATED         : July 21, 1998
INVENTOR(S)   : Shinohara It is certified that error appears in the above-identified patent and that said Letters Patent is hereby corrected as shown below:

OTHER DOCUMENTS

| | |
|---|---|
| | Chang, Feng et al., "Elastomer toughening of polyacetal", *Chemical Abstracts,* 114, 54, 5-6-91 |
| | Japan Synthetic Rubber Co., "Thermoplastic resin compositions", *Chemical Abstracts (Plastics Manuf.),* 102, 41, 5-20-85 |
| | Wen-Yen Chiang et al., "Polyacetal/poly(tetrafluoroethylene) blends, I The effect of Na-treated poly(tetrafluoroethylene) on polyacetal", *Angewandte Makromolekulare Chemie, Applied Macromolecular Chemistry and Physics,* 196, 21-35, March 1992 |
| | Wen-Yen Chiang et al., "Properties of Copolymer-Type Polyacetal/Ethylene-Propylene-Diene Terpolymer Blends", *Journal of Applied Polymer Science,* 47, 105-112, 1-5-93 |
| | Ludwig Bottenbruch, "Polycarbonate Polyacetale Polyester Celluloseester", *Kunststoff Handbuch,* 326-331 |

Signed and Sealed this

Fourth Day of May, 1999

Attest:

Attesting Officer

Q. TODD DICKINSON

Acting Commissioner of Patents and Trademarks